(12) United States Patent
Perego

(10) Patent No.: US 6,318,807 B1
(45) Date of Patent: Nov. 20, 2001

(54) SEPARABLE FRAME AND CHILD RECEPTION MEMBER ASSEMBLY

(75) Inventor: Gianluca Perego, Arcore (IT)

(73) Assignee: Peg Perego S.p.A. (IT)

( * ) Notice: Subject to any disclaimer, the term of this patent is extended or adjusted under 35 U.S.C. 154(b) by 0 days.

(21) Appl. No.: 09/499,240

(22) Filed: Feb. 7, 2000

(30) Foreign Application Priority Data

Feb. 19, 1999 (IT) .............................................. MI99A0338

(51) Int. Cl.⁷ ...................................................... A47C 7/00
(52) U.S. Cl. ................ 297/440.22; 297/130; 297/256.16
(58) Field of Search ........................... 297/440.22, 250.1, 297/256.16, 130

(56) References Cited

U.S. PATENT DOCUMENTS

| | | | |
|---|---|---|---|
| 3,290,050 | * 12/1966 | Ezquerra | 297/130 |
| 4,634,177 | * 1/1987 | Meeker | 297/440.22 X |
| 4,759,580 | 7/1988 | Berklich, Jr. et al. | |
| 4,836,573 | * 6/1989 | Gebhard | 280/644 |
| 5,234,224 | * 8/1993 | Kim | 297/150 X |
| 5,567,008 | * 10/1996 | Cone, II | 297/256.16 |
| 5,772,279 | * 6/1998 | Johnson, Jr. | 297/130 |

FOREIGN PATENT DOCUMENTS

0514054A1 * 11/1992 (EP) .
0 895 922 A1   2/1999 (EP) .

* cited by examiner

*Primary Examiner*—Peter M. Cuomo
*Assistant Examiner*—Stephen Vu
(74) *Attorney, Agent, or Firm*—McGlew and Tuttle, P.C.

(57) ABSTRACT

A frame assembly (11) and child reception member (12, 112) such as a child reception nacelle or seat with a mutual removable fastening device. The fastening device has controllable hooking members (21, 23) which are arranged on the reception member (12, 112) to engage corresponding fixed hooking members (22) on the frame (11).

15 Claims, 3 Drawing Sheets

SEPARABLE FRAME AND CHILD RECEPTION MEMBER ASSEMBLY

FIELD OF THE INVENTION

The present invention relates to a separable frame and child reception member assembly. In particular the reception member can be a baby carriage nacelle or a stroller seat.

BACKGROUND OF THE INVENTION

In the prior are there are known assemblies made up of a frame and a member such as a seat or nacelle which can be separated by control of appropriate mutual fastening members. In accordance with the prior art the operating fastening members are always arranged on the frame to engage fixed members present on the reception member. Operation of these fastening members is always difficult because they are located beneath the reception member. In addition, the fastening members are usually at least two in number arranged on opposite sides of the frame. Although there are proposals of two interconnected fastening members to have centralized control, usually the use of at least two independent fastening members to provide greater safety against accidental release is preferred.

On the contrary it has been found that this introduces an additional risk factor. Indeed, whether with independent fastening members or centralized control, once the fastening members are released the reception member merely rests on the frame while the user has his hands still engaged in the releasing operation. The user must then quit both the frame and the reception member to be able to seize the reception member at the points or grips provided for that purpose. There is thus a lapse of time during which an uncontrolled movement of the child in the reception member or an involuntary external blow could cause falling of the reception member from the frame. In the prior art it was sought to eliminate the danger by providing fastening members with precise predetermined mostly horizontal release directions to be followed once appropriate stops were opened. Although this reduces the danger there is still a possibility that the accidental movement take place just in the separation direction causing separation and falling.

Another shortcoming of the above mentioned prior art is that by requiring predetermined separation movements even the mutual hooking movement which in general must mainly take place simultaneously on opposite sides of the frame becomes difficult.

In addition it is impossible to prearrange automatic hooking systems e.g. with springs since it is necessary that the fastening members have a permanent release position to allow the user to abandon them to grasp the reception member and remove it. It is therefore possible to forget to lock the reception member firmly on the frame. If it is considered that usually the hooking and unhooking operations take place with the child present in the reception member and hence with the need to lift and move the weight thereof, the difficulty of use becomes evident.

SUMMARY AND OBJECTS OF THE INVENTION

The general purpose of the present invention is to remedy the above mentioned shortcomings by making available a frame and child reception member assembly which would be fast and safe to operate.

In view of this purpose it was sought to provide in accordance with the present invention a frame and child reception member assembly with removable mutual fastening means characterized in that the fastening means have controllable hooking members which are arranged on the reception member to engage corresponding hooking members fastened on the frame.

To clarify the explanation of the innovative principles of the present invention and its advantages compared with the prior art there is described below with the aid of the annexed drawings a possible embodiment thereof by way of non-limiting example applying said principles.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
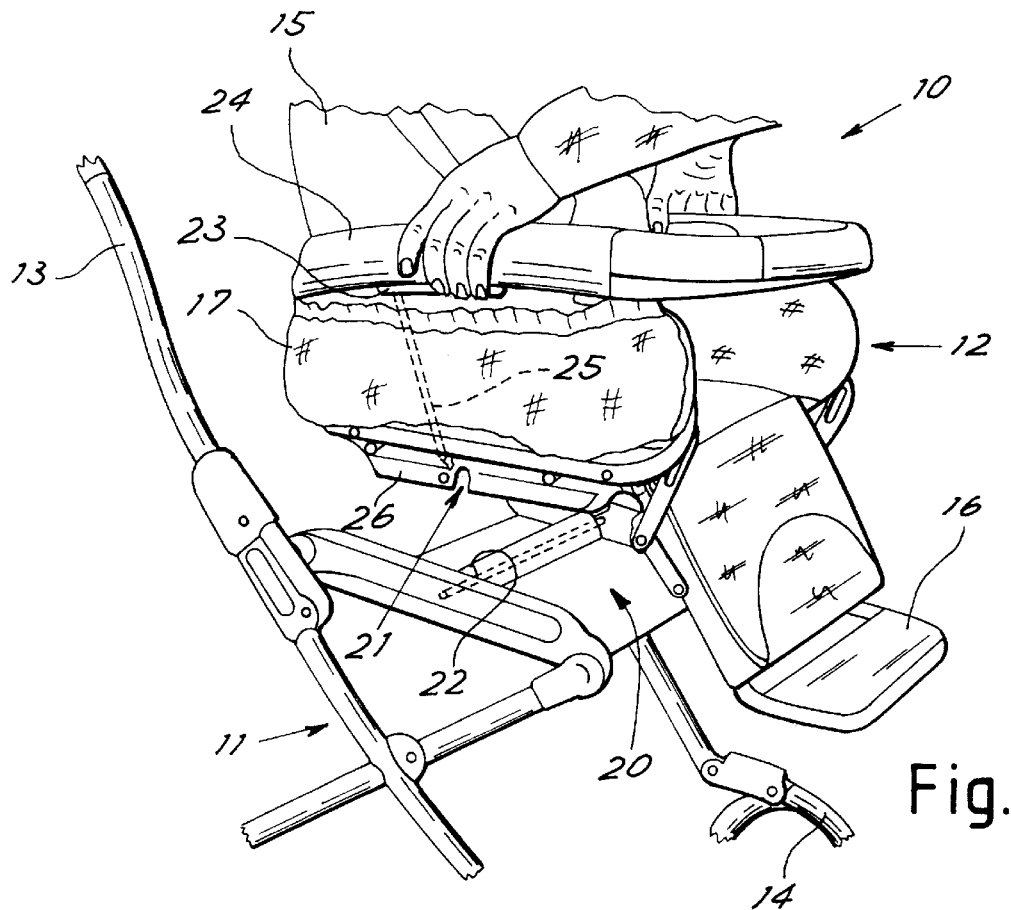
FIG. 1 shows a partial diagrammatic perspective view of a frame and reception member assembly in the form of a stroller.
Figure 5:
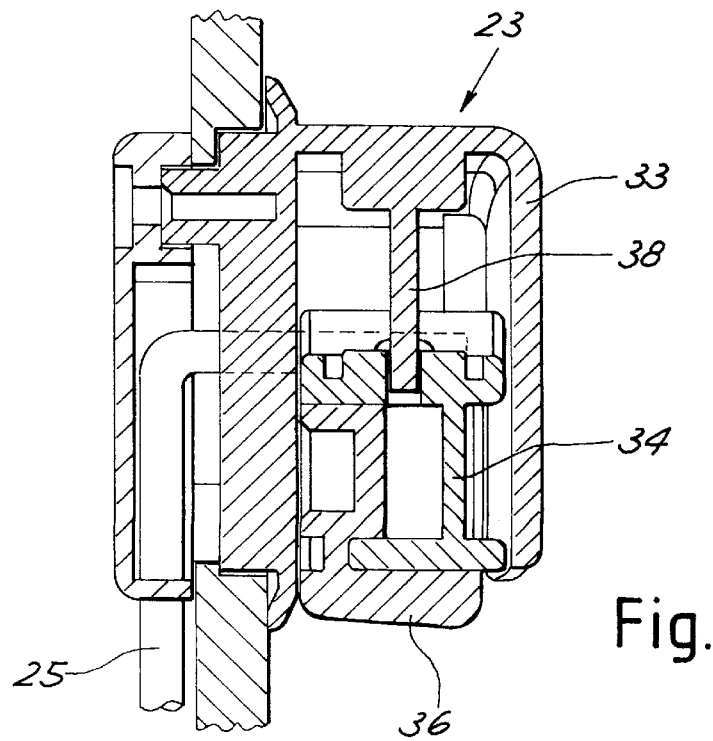
FIG. 5 shows a cross section view along plane of cut V—V of FIG. 1.
Figure 2:
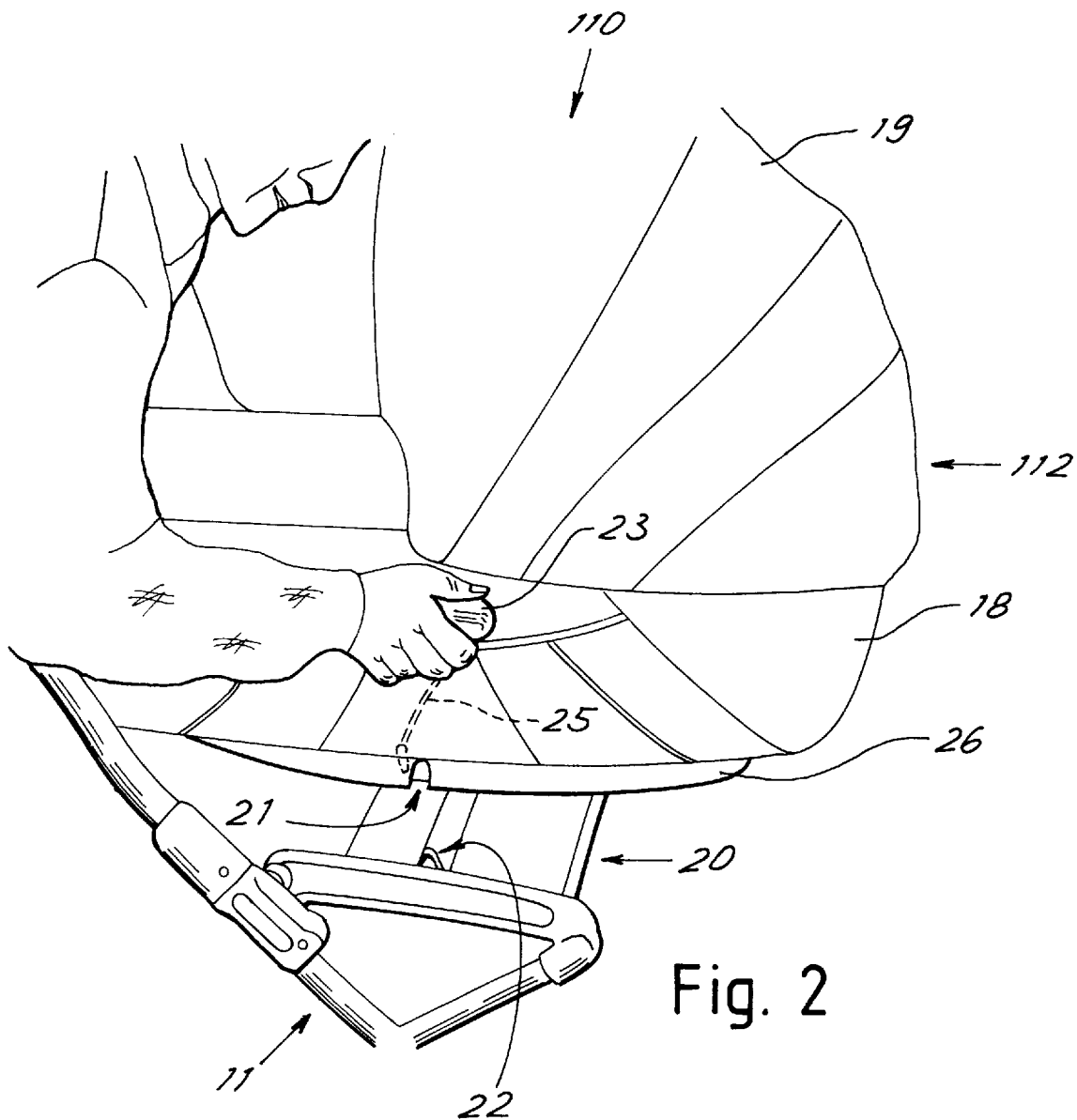
FIG. 2 shows a view similar to FIG. 1 with the reception member in nacelle form to provide a baby carriage.

With reference to the FIGS FIG. 1 shows an assembly indicated as a whole by reference number 10 comprising a frame 11 e.g. of the metal tube type hinged to be foldable and a child reception member 12. In FIG. 1 the reception member is provided by way of example in the form of a seat to provide a stroller. FIG. 2 shows an assembly 110 with the same frame 11 with reception member 112 provided in the form of a nacelle to form a baby carriage.

The frame, nacelle and seat are not further shown or described since they are virtually prior art in their main lines and therefore easily imaginable to one skilled in the art. For example, the frame could comprise a handlebar 13 and wheel units 14. The seat 12 could have e.g. a reclining back 15, an adjustable foot rest 16 and side panels 17. The nacelle 112 could have a padded shell or cradle 18 and a bellows hood 19.

The frame 11 has a zone 20 for support of the reception member. Between the frame and the reception member are removable fastening means for holding the reception member in place on the frame.

In accordance with the present invention the removable fastening means comprise controlled hooking means or members 21 arranged below on both sides of the reception member to engage with corresponding frame hooking members 22 fastened on the underlying frame. The engagement means 21 are arranged in side parts 26, e.g. in the form of boxed plastic shoes for support of the reception member on the frame.

Advantageously each of the controlled hooking means has a control member 23 arranged in a zone corresponding to the hand grip zone for lifting the reception member so that the disengagement action and subsequent lifting do not require release and regrasping of the containment member.

For the member in seat form, positions found advantageous are near the upper part of the side panels. For the nacelle the positions found advantageous are on both sides of the cradle. While for the seat the control members can be arranged beneath the two arms 24 of the side panels which also constitute grasping members, in the cradle the control members are provided in, or provide by themselves, grasping members protruding from both side walls of the cradle as may be seen in FIGS. 1 and 2.

Between the operating member 23 and the engagement means 21 are arranged connecting tie rods 25 advantageously masked in the structure.

Figure 3:
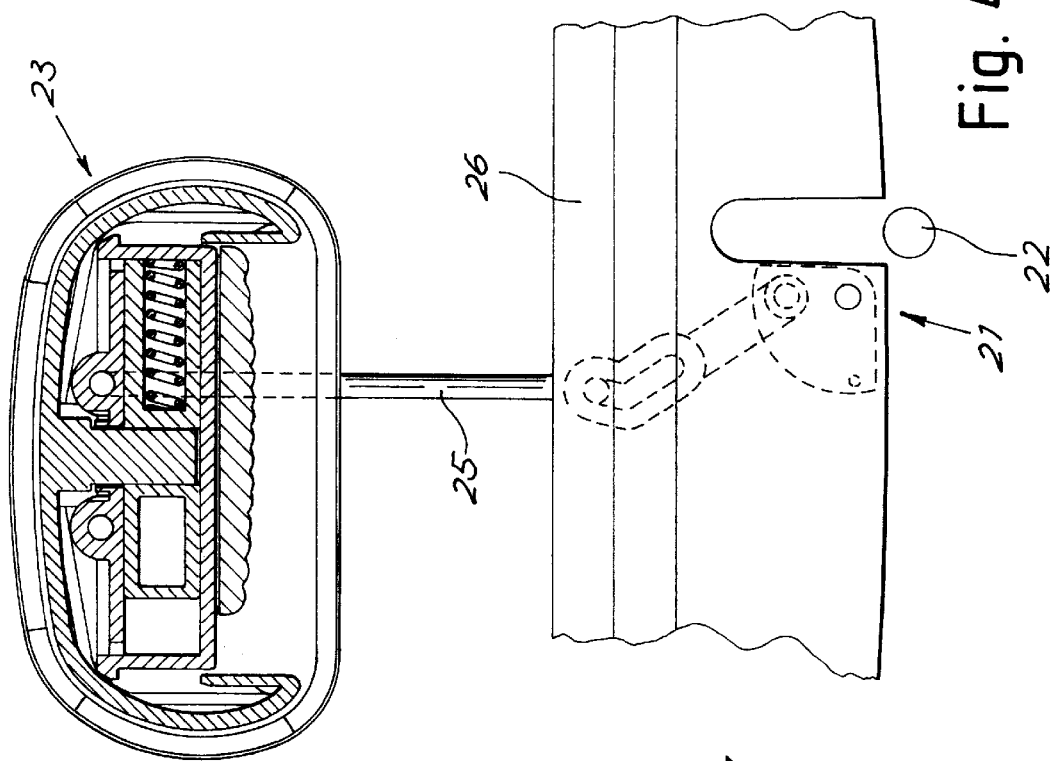
FIGS. 3 and 4 show diagrammatic cross section views of a hook and release unit present in the assembly in accordance with the present invention.
Figure 4:
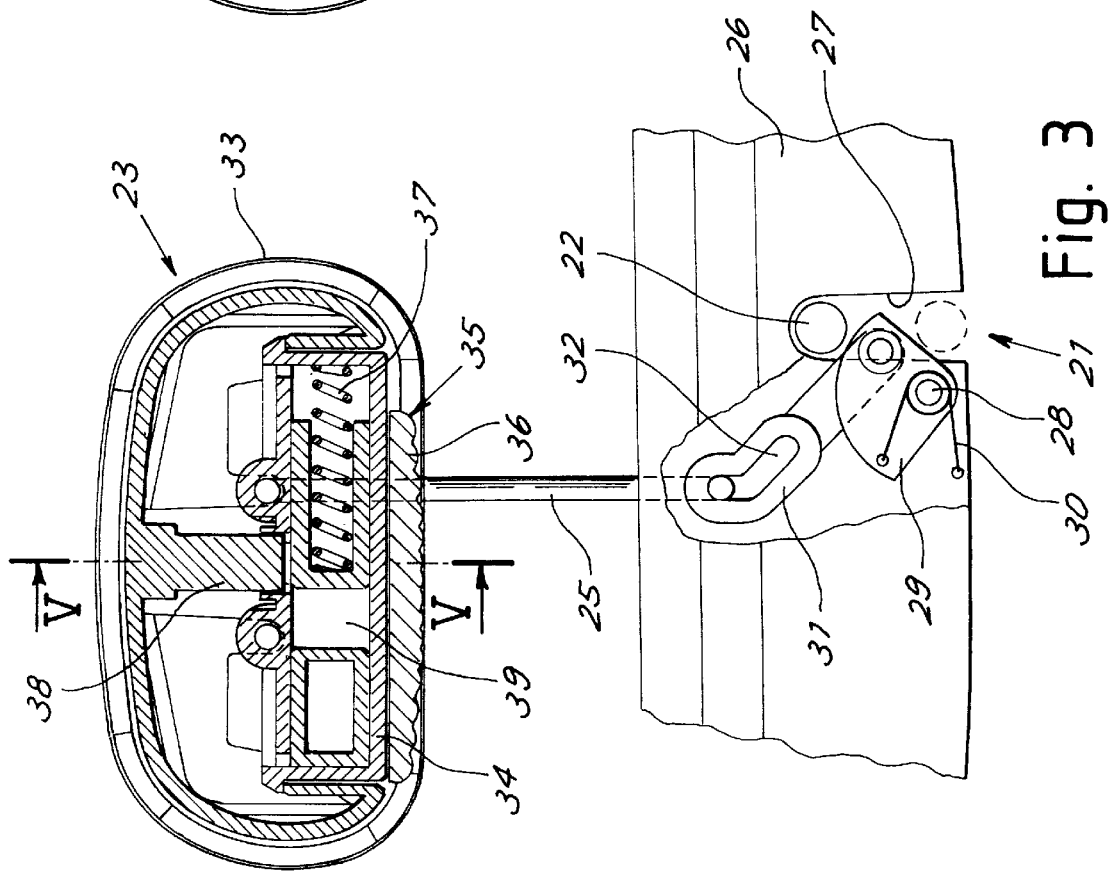

The unit consisting of a control member and the corresponding hooking means is shown in FIG. 3 in rest or hooking position while in FIG. 4 it is shown in operated or released position. Only one unit is shown since the other is virtually identical and arranged symmetrically on the opposite side of the reception member 12 or 112.

In the embodiment shown the hooking means or member 21 comprise a vertical groove or seat 27 open below for receiving a horizontal pin providing the hooking member 22 fastened to the frame. The pin 22 can be only one for both the engagements and extending horizontally between the two side panels of the frame.

At the side of the seat 27 is hinged at 28 a shutter 29 thrust by a spring 30 to close the inlet to the seat 27. The tie rod 25 has a terminal part 31 which hinges it to the shutter 29 to rotate it on command around the pin 28 so as to disengage the seat 27. Advantageously the terminal part 31 had a slot 32 for sliding of the tie rod (made e.g. in the form of an appropriately shaped round iron bar) in the direction opposite to that of shutter disengagement to allow elastic movement of the shutter towards the disengagement position upon the thrust produced thereon by the pin 22 when the reception member is rested on the frame and the pin enters the seat 27 as shown in broken lines in FIG. 3.

In this manner the hooking can take place automatically merely by resting the reception member on its frame. The assembly can therefore take place blind with no need of bending to observe the hooking point or making particular approach movements.

The control member 23 comprises a grasping shell 33 in which runs a control handle 34 to which is connected the upper end of the tie rod 25. This way by pushing the handle 34 upwards with the fingers the shutter 29 is moved to the release position as shown in FIG. 4 to allow free lifting of the containing member and separation thereof from the frame. It is clear that this operation can be performed easily when the containing member is grasped to support it with no need of moving the hands. Accidental release is prevented by the fact that the release operation must be performed simultaneously on both the hooking devices which are mutually independent.

To provide further safety the control member can be supplied with a safety device 35 which must be operated to allow the release movement of the handle 34. The safety device shown comprises a member or cursor 36 which runs laterally on the handle against the action of a spring 37.

In the rest position (FIG. 3) the safety device prevents lifting of the handle 34 because of interference of the safety device with a locking part 38 fastened in the handle seat. When moving the safety device sidewise (FIG. 4) a passage 39 thereof aligns with the locking part 38 which can penetrate the passage 39 to allow upward handle movement.

Since the safety device has a control part which covers the handle grasping part, operation of the safety device can be accomplished conveniently but only voluntarily thanks also to the orthogonal movements of the handle and the safety device during grasping of the handle.

With a single movement of the hand it is thus possible to grasp the handle, remove the safety device and lift the nacelle or seat.

It is now clear that the predetermined purposes have been achieved by making available a frame and child reception assembly easy to assemble and disassemble with no operating or safety problems. The system proposed is also the 'intrinsically safe' type e.g. ensuring hooking steadiness even in case of breakage of the control means.

Naturally the above description of an embodiment applying the innovative principles of the present invention is given by way of non-limiting example of said principles within the scope of the exclusive right claimed here.

For example the appearance of the frame, nacelle or seat could be different from that shown depending on specific requirements. Although a frame identical for both embodiments shown is described the frame could naturally be different in the case of a baby carriage or stroller even if interchangeability could be advantageous. Support and guide members for engagement could be provided between the reception member and the frame.

What is claimed is:

1. A frame and child reception member assembly having controllable, movable hooking members arranged on the reception member to engage corresponding fixed hooking members fastened on the frame, the movable hooking member each comprising a control member and an engagement means, with the engagement means being kinematically connected to the control member for moving between a hooking position and a release position upon operation of the control member, wherein the control member comprises a handle movable between a first resting position and a second release position for release of the engagement means, and the control member firther comprises a safety device, which must be operated to allow movement of the handle from the first resting position to the second release position.

2. The assembly in accordance with claim 1 wherein the control member and the engagement means are kinetically connected by means of a tie rod.

3. The assembly in accordance with claim 1 wherein the engagement means comprise a seat open below to receive a corresponding sad hooking member fastened to the frame and a shutter movable between a closed position and an open position of a mouth of the seat with the shutter being connected to the control member for movement of the shutter towards the open position.

4. The assembly in accordance with claim 3 wherein the hooking member fastened to the frame is provided in a form of a pin extending transversely between side panels of the frame.

5. The assembly in accordance with claim 3 wherein the shutter is elastically movable towards the open position upon thrusting of the hooking members fastened to the frame in the direction of its entry into the seat, thereby allowing snap fastening the hooking members in the seat.

6. The assembly in accordance with claim 1 wherein the safety device is made in a form of a cursor sliding against an action of a spring between a safe position in which the cursor locks movement of the handle and a control position in which the cursor allows free movement of the handle.

7. The assembly in accordance with claim 6 wherein the handle and safety device movements are at right angles.

8. The assembly in accordance with claim 7 wherein the safety device is arranged on a grasping surface of the handle.

9. The assembly in accordance with claim 8 wherein the handle movement is substantially vertical.

10. The assembly in accordance with claim 1 wherein the control member is part of a grasping member for the reception member for lifting thereof to allow simultaneous grasping of the receptionmember and release of the reception member from the frame.

11. The assembly in accordance with claim 10 wherein the reception member is a nacelle of a baby carriage and that the control member has a corresponding second control member, wherein both of the control members protruding laterally from opposite side panels of the nacelle.

12. The assembly in accordance with claim 10 wherein the reception member is a seat reception member of a stroller and that the control members member has a corresponding second control member, wherein both of the control members are arranged on each opposite arm of the seat reception member.

13. The assembly on accordance with claim 1 wherein the reception member is a nacelle of a baby carriage.

14. The assembly in accordance with claim 1 wherein the reception member is a seat reception member of a stroller.

15. A child carrying assembly comprising:
 a frame;
 a frame hooking member arranged on said frame;
 a child reception member selectively connectable to said frame;
 a movable hooking member arranged on said child reception member and engageable with said frame hooking member;
 a control member connected to said movable hooking member, said control member being movable between a rest position and a disengaged position, said control member in said rest position holding said movable hooking member engaged with said frame hooking member, said control member in said disengaged position holding said movable hooking member disengaged from said frame hooking member;
 a safety device connected to said control member and movable between a safety position and a release position, wherein said safety device in said safety position prevents movement of said control member into said disengaged position.

* * * * *